Feb. 14, 1933. A. N. MERLE 1,897,268

FINDER FOR CAMERAS PROVIDED WITH OBJECTIVES OF DIFFERENT FOCI

Filed July 25, 1932

André Noël Merle
INVENTOR his ATTORNEY.

Patented Feb. 14, 1933

1,897,268

UNITED STATES PATENT OFFICE

ANDRÉ NOËL MERLE, OF VINCENNES, FRANCE, ASSIGNOR TO PATHE CINEMA, ANCIENS ETABLISSEMENTS PATHE FRERES, OF PARIS, FRANCE, A FRENCH COMPANY

FINDER FOR CAMERAS PROVIDED WITH OBJECTIVES OF DIFFERENT FOCI

Application filed July 25, 1932, Serial No. 624,525, and in France September 24, 1931.

At the present time, with the finders for cameras which consist of a sighting glass whose field corresponds to the field of the camera objective, the use of objectives of different foci makes it necessary either to mark upon the front lens of the finder a certain number of rectangles limiting the fields corresponding to the different objectives, or, by the use of covering pieces with rectangular apertures applied upon the front lens, to limit or mark out these different fields by reducing the opening of this lens.

The first of these methods has an advantage over the second, consisting in the fact that in the case of objectives of long focus, it leaves around the field which it determines for such objectives, a region of a sufficient extent which is visible to the operator, who can thus operate more readily when selecting a subject by means of the finder.

It has however a drawback, which is not found in the second method, consisting in the fact that the limits of the field do not appear distinctly to the operator's eye, as he is unable to accommodate the eye upon the subject in the field and upon the front lens of the finder at the same time.

The present invention relates to a finder for cameras provided with objectives of different foci, which is chiefly characterized by the fact that the front lens of the finder comprises two or more regions limited by homothetic rectangles having a common centre, which regions have different colours. The aggregate of the field of the finder corresponds to the field of the objective having the shortest focus, the intermediate regions correspond to the fields of the intermediate objectives, and the free or white central region corresponds to the field of the objective having the longest focus.

Further characteristics of the invention will be set forth in the following description.

In the accompanying drawing which is given by way of example:

According to the form of construction herein represented, the finder essentially comprises in the known manner, a divergent lens 1, situated at the front and having the function of an objective, and a convergent lens 2 situated at the rear and having the function of an eye-piece.

According to the invention, the surface of the lens 1 is divided into two rectangles 3 and 4 which are homothetic and have a common centre, marking out two regions of different colours.

Figure 1:
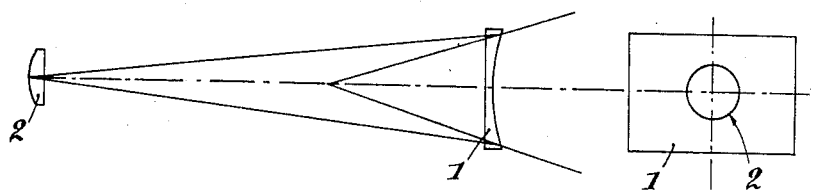
Fig. 1 is a diagrammatic longitudinal section of the finder.
Figure 2:
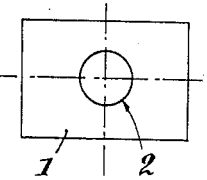
Fig. 2 is a corresponding cross-section.
Figure 3:
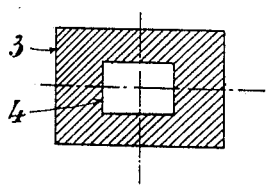
Fig. 3 is a cross-section representing two coloured surfaces of a lens.

In order to obtain such regions, there is cut out, for instance in coloured acetate of cellulose, a rectangle having the form and dimensions of the divergent lens of the finder. At the centre of this rectangle is cut out a rectangle corresponding to the rectangle of Figure 3. This affords a piece of the acetate substance which is placed against the front glass of the finder and is maintained by the frame of the latter.

The observer, when looking into this finder, perceives two different regions: at the centre, a rectangle 4 which is not coloured, and around this rectangle, a coloured region extending to the limit of the field of the finder.

This device is employed in the case of a camera comprising two objectives having different focal distances.

The effective opening of the lens is represented by the surface comprised in the interior of the rectangle 3; this opening shows to the person using the finder, only the field corresponding to that of the two objectives which has the shorter focus.

The rectangle 4 corresponds to the field of the objective having the long focus. The surface comprised between the rectangles 3 and 4 is coloured pink, for instance, whilst the one situated in the interior of the rectangle 4 is not coloured.

This difference in the colour permits, without useless fatigue, and with the use of an objective of long focus, to instantly observe the field pertaining to the objective utilized, as the eye may accommodate itself to the subject to be taken by cinematography without ceasing to perceive the limits of this field. On the other hand, as the region comprised between the rectangles 3 and 4 leaves visible to the operator a considerable region around the field corresponding to the objective of long focus, this permits to readily locate in the finder the subject sought for by the operator employing this objective.

Figure 5:
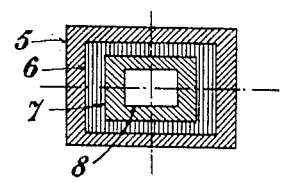
Fig. 5 is a cross-section showing four coloured surfaces of a lens.
Figure 4:
Fig. 4 is a corresponding plan view.

In the arrangement shown in Fig. 5, the front lens of the finder is adapted for use with a motor-camera provided with four objectives having different foci.

The rectangle 5 corresponds to the field of the objective having the shortest focus, the rectangle 8 to the field of the objective having the longest focus and the rectangles 6 and 7 to the fields of the objectives having the intermediate foci. These rectangles are all in homothetic disposition, and the centre of such disposition is the common centre of the rectangles.

As the colour of the regions limited by these rectangles is different for each rectangle, this affords, for instance, a red colour between the rectangles 8 and 7, a yellow colour between the rectangles 7 and 6, and a green colour between the rectangles 6 and 5.

Figure 6:
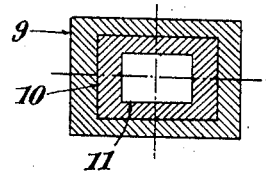
Fig. 6 is an analogous view relating to three coloured surfaces.

In the arrangement shown in Fig. 6, the lens is adapted for a camera provided with three objectives having different foci, the rectangles 9, 10 and 11 having the same relations as above mentioned and the same limitation of the colours.

Figure 7:
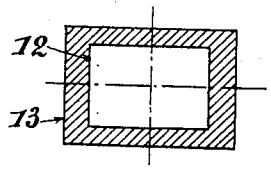
Figs. 7 and 8 show cut-out rectangles with the use of several colours.
Figure 8:
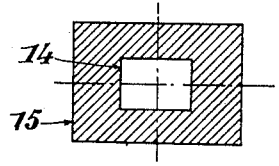

In this case, there are cut out two rectangles of acetate of cellulose material having the shape and size of the rectangle 9, one of which is coloured blue and the other red. The one which is coloured blue is apertured at the centre by a rectangle 14 which is identical with the rectangle 11, and the one coloured yellow is apertured by a rectangle 12 identical with the rectangle 10. The rectangles 13 and 15 are identical with the rectangle 9. This affords two pieces of acetate material, as shown in Figs. 7 and 8, which when applied to the divergent lens of the finder will give three different regions formed by the cellulose material.

The region of the centre is not coloured. The region comprised between the rectangles 11 and 10 will be blue and the region comprised between the rectangles 10 and 9 will have a colour resulting from the superposition of the yellow and the blue.

It is obviously feasible to constitute the four regions of the example shown in Figure 5 in a manner analogous to what has been above indicated.

Obviously, the invention is in no wise limited to the method of execution herein described and represented, this being given solely by way of example.

Having now described my invention what I claim as new and desire to secure by Letters Patent is:

1. In a camera, in combination a plurality of objectives of different foci, a finder, means for forming in the field of said finder a number of coaxial figures equal to the number of objectives, said figures limiting in the finder regions corresponding to the fields of the different objectives, and means for imparting different transparent colours to the spaces comprised between each two consecutive figures.

2. In a camera, in combination a number of objectives of different foci, a finder, and a same number of transparent frames differently coloured interposed in the field of the finder and having central apertures limiting in the finder regions corresponding to the fields of the different objectives.

3. In a camera, in combination a number of objectives of different foci, a finder comprising a front lens and an eye-piece, and a same number of transparent frames differently coloured applied on said front lens and having central apertures limiting in the finder regions corresponding to the fields of the different objectives.

4. In a camera, in combination a number of objectives of different foci, a finder and a same number of transparent frames differently coloured of acetate of cellulose interposed in the field of the finder and having central apertures limiting in the finder regions corresponding to the fields of the different objectives.

5. In a camera, in combination, a number of objectives of different foci, a finder comprising a front lens and an eye-piece, and a same number of transparent frames differently coloured interposed in the field of the finder and having central apertures homothetic and coaxial with the outline of said front lens and limiting in the finder regions corresponding to the fields of the different objectives.

In testimony whereof I have signed my name to this specification.

ANDRÉ NOËL MERLE.